(12) United States Patent
Kawaguchi et al.

(10) Patent No.: US 10,916,749 B2
(45) Date of Patent: Feb. 9, 2021

(54) BATTERY MODULE IN-VEHICLE INSTALLATION STRUCTURE

(71) Applicant: AISIN KEIKINZOKU CO., LTD., Imizu (JP)

(72) Inventors: Satoshi Kawaguchi, Takaoka (JP); Kosuke Kido, Toyama (JP)

(73) Assignee: AISIN KEIKINZOKU CO., LTD.

( * ) Notice: Subject to any disclaimer, the term of this patent is extended or adjusted under 35 U.S.C. 154(b) by 32 days.

(21) Appl. No.: 16/263,192

(22) Filed: Jan. 31, 2019

(65) Prior Publication Data

US 2019/0237724 A1   Aug. 1, 2019

(30) Foreign Application Priority Data

Feb. 1, 2018 (JP) ................. 2018-016069

(51) Int. Cl.
*H01M 2/10* (2006.01)
*B60L 50/64* (2019.01)
*B60L 50/60* (2019.01)

(52) U.S. Cl.
CPC .......... *H01M 2/1083* (2013.01); *B60L 50/64* (2019.02); *B60L 50/66* (2019.02); *H01M 2/1077* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 10,207,574 B2 * | 2/2019 | Ozawa | H01M 2/1083 |
| 2009/0239136 A1 | 9/2009 | Nagamine et al. | |
| 2017/0305251 A1 * | 10/2017 | Hara | B60L 3/0007 |
| 2018/0013113 A1 * | 1/2018 | Wuensche | H01M 2/1083 |
| 2018/0029493 A1 * | 2/2018 | Kobayashi | B60L 50/66 |
| 2018/0050607 A1 * | 2/2018 | Matecki | B60K 1/04 |
| 2018/0062224 A1 * | 3/2018 | Drabon | H01M 10/613 |
| 2018/0145291 A1 * | 5/2018 | Uchiyama | H01M 10/0481 |
| 2018/0166668 A1 * | 6/2018 | Inoue | H01M 2/1016 |
| 2018/0194213 A1 * | 7/2018 | Kobayashi | H01M 2/1083 |
| 2018/0269441 A1 * | 9/2018 | Yum | H01M 2/1077 |
| 2019/0058172 A1 * | 2/2019 | Syed | H01M 10/655 |
| 2019/0237725 A1 | 8/2019 | Kawaguchi et al. | |
| 2020/0062130 A1 * | 2/2020 | Wuensche | H01M 2/1077 |
| 2020/0091571 A1 * | 3/2020 | Burgers | H01M 10/6556 |

FOREIGN PATENT DOCUMENTS

| | | |
|---|---|---|
| JP | 2012-123917 A | 6/2012 |
| KR | 100709262 | 4/2007 |

* cited by examiner

*Primary Examiner* — Scott J. Chmielecki

(74) *Attorney, Agent, or Firm* — Harness, Dickey & Pierce, P.L.C.

(57) ABSTRACT

Provided is a battery module in-vehicle installation structure, including: a pair of side frames that are fixed to a vehicle and arranged at intervals in a width direction of the vehicle; a case body fastened between the pair of side frames; and a mounting member for mounting the battery module inside the case body. The case body has a floor, side walls standing upright at peripheral edges of the floor, and fastening portions extended respectively from the side walls toward an outer side in the width direction. The mounting member has a pair of fixing portions each extended toward the outer side in the width direction. Each of the pair of fastening portions is fastened so as to be sandwiched between one of the pair of fixing portions and one of the pair of side frames.

5 Claims, 2 Drawing Sheets

BATTERY MODULE IN-VEHICLE INSTALLATION STRUCTURE

The present application includes the contents of Japanese Patent Application No. 2018-016069 filed on Feb. 1, 2018. The entire disclosure of Japanese Patent Application No. 2018-016069 filed Feb. 1, 2018 is expressly incorporated herein by reference.

BACKGROUND

The present disclosure relates to an installation structure for installing a driving battery in a vehicle.

A secondary battery is installed for driving in an electric vehicle, a hybrid vehicle, a plug-in hybrid vehicle, etc.

To extend the distance that a vehicle can run on a single charge, it is necessary to install a high-capacity battery.

A secondary battery in which a large number of single cells are stacked is called a battery module.

A secondary battery is also called a battery pack, an EV battery, etc.

In this specification, a secondary battery will be referred to as a battery module.

As the capacity of a battery module installed in a vehicle increases, many problems to be solved arise, including increasing the installation space efficiency, providing protection from an external impact, and performing cooling to counteract heat generation.

For example, JP-A-2012-123917 discloses a structure in which a battery module is covered by an upper holder and a lower holder that is fixed to a tray, such that side walls of the upper holder overlap side walls of the lower holder, and the tray is installed in a vehicle by brackets.

However, the problem is that the structure for mounting the battery module is complicated and requires a large space.

DESCRIPTION OF EXEMPLARY EMBODIMENTS

Figure 1A:
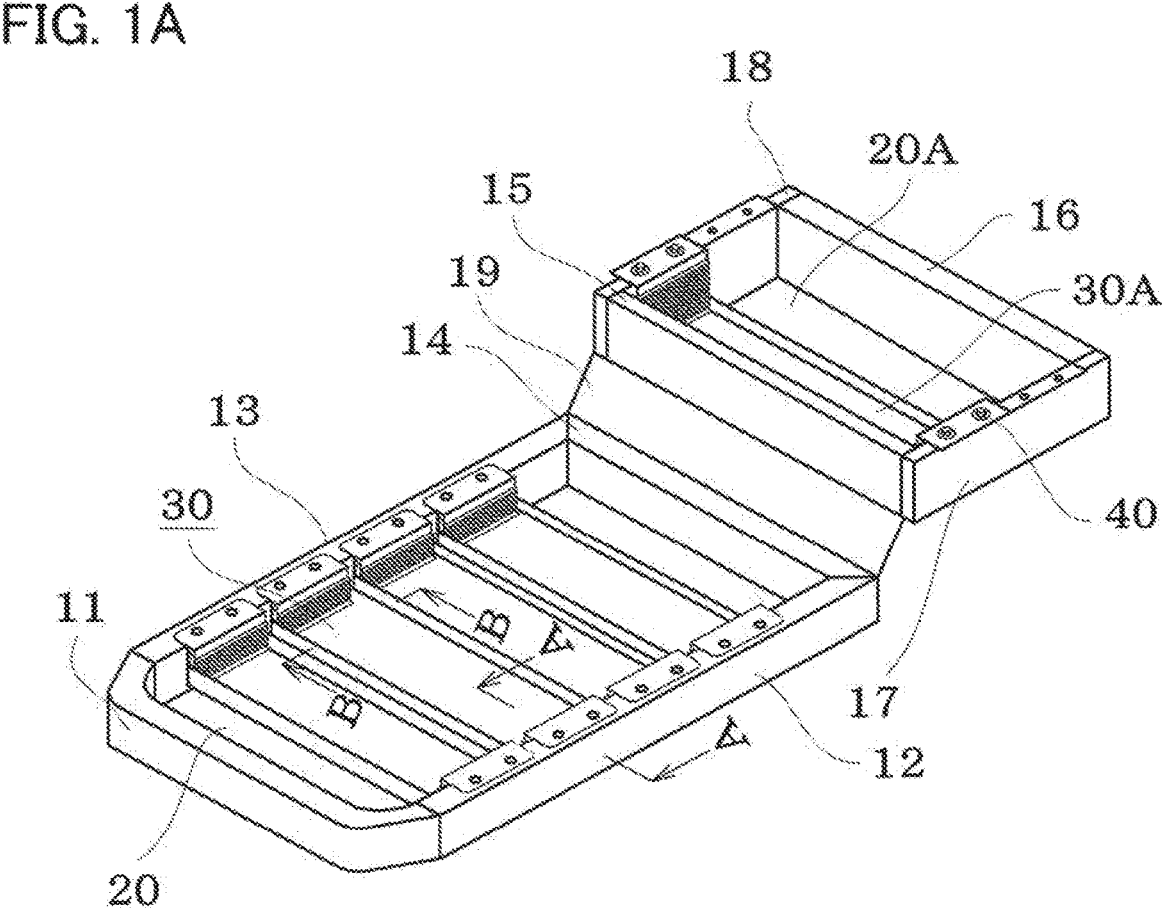
FIG. 1A illustrates a perspective view of a battery module installation structure according to the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

An object of the disclosure is to provide an installation structure that is highly effective in protecting a battery module and can effectively save space when used to install the battery module in a vehicle.

In accordance with one of some embodiments, there is provided a battery module in-vehicle installation structure, comprising:

a pair of side frames that are fixed to a vehicle and arranged at intervals in a width direction of the vehicle;

a case body fastened between the pair of side frames; and a mounting member for mounting a battery module inside the case body, the case body having a floor, side walls standing upright at peripheral edges of the floor, and a pair of fastening portions extended respectively from the side walls toward an outer side in the width direction, the mounting member having a pair of fixing portions each extended toward the outer side in the width direction, each of the pair of fastening portions being fastened so as to be sandwiched between one of the pair of fixing portions and one of the pair of side frames.

Here, the pair of side frames do not need to be parallel to each other, as long as the pair of side frames are mounted on the vehicle at a predetermined interval in the width direction of the vehicle and disposed so as to face each other.

The case body is fastened between the pair of side frames, to house the battery module inside the case body by means of the mounting member. It is preferable to provide the battery module inside the case body by using a space available in a vehicle body, for example, by providing the battery module under a floor of the vehicle body or under a seat.

For example, in the case where the battery module is provided under the floor of the vehicle body, disposing the pair of side frames along inner sides of frameworks of the vehicle body, such as rocker frames of the body, can improve the battery module protecting effect.

In accordance with one of some embodiments, the battery module in-vehicle installation structure, wherein the mounting member includes a holding part that holds the battery module, and a pair of mounting parts coupled to and standing upright at both ends of the holding part, and the pair of fixing portions are provided respectively at leading end sides of the pair of mounting parts.

As a result, in some embodiments, an external impact is transmitted while being dispersed to the side frame, the case body, and the mounting member, so that the battery module protecting effect is improved.

In accordance with one of some embodiments, the battery module in-vehicle installation structure, wherein a clearance is provided in the width direction between each of the side walls and each of the pair of side frames.

As a result, in some embodiments, an external impact that is directly transmitted from the side frame to the case body can be reduced.

In accordance with one of some embodiments, the battery module in-vehicle installation structure, wherein a clearance is provided in the width direction between each of the side walls and each of the pair of mounting parts.

As a result, in some embodiments, an external impact that is directly transmitted from the case body to the mounting member can be reduced.

In accordance with one of some embodiments, the battery module in-vehicle installation structure, wherein the pair of side frames are formed by extruded materials having a hollow sectional shape.

As a result, in some embodiments, the weight of the pair of side frames can be reduced, and moreover the external impact absorbing effect is enhanced.

In accordance with one of some embodiments, the battery module in-vehicle installation structure, wherein the holding part of the mounting member is a panel body having a hollow sectional shape.

As a result, in some embodiments, the protective effect is enhanced also against an impact from below, and moreover a hollow portion provided inside the holding part can be used to circulate a refrigerant to thereby exert a cooling effect on the battery module.

As has been described above, in the battery module in-vehicle installation structure according to the disclosure, an impact applied from outside is dispersed to the side frame and the case body before being transmitted to the mounting member. Thus, this structure has an excellent battery module protecting effect, and moreover allows a high-capacity battery module to be installed in a smaller space than hitherto.

In the following, an example of the structure for installing a battery module in a vehicle according to the disclosure will be described based on the drawings, but the disclosure is not limited to this example.

FIG. 1A illustrates an example in which a battery module 1 is installed from under a floor of a vehicle body to under a seat. However, the battery module may be installed only under the floor or only under a seat.

Under the floor of the vehicle body, a pair of side frames 12, 13 are disposed on an inner side of vehicle body frames 2, such as rocker arms of the vehicle body, so as to be arranged at intervals in a width direction of the vehicle body.

Figure 1B:
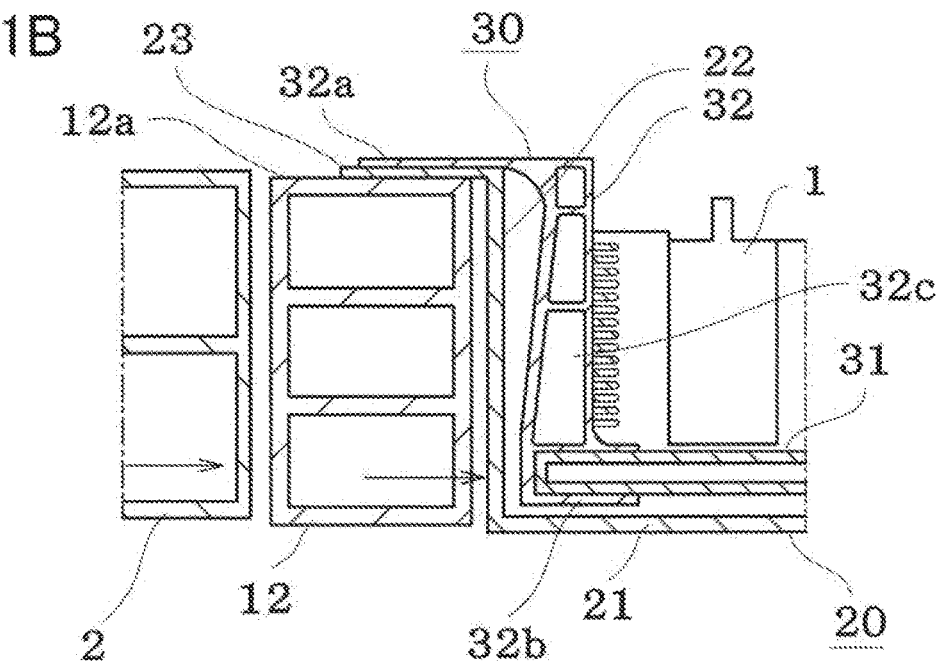
FIG. 1B illustrates a sectional view taken along line A-A of FIG. 1A.

In this example, the pair of side frames 12, 13 are produced using extruded materials made of an aluminum alloy, for example, and have a hollow sectional shape that is a triple-hollow sectional shape as shown in FIG. 1B.

The extruded material may instead have a double-hollow shape, a single-hollow shape, etc.

Both ends of the pair of side frames 12, 13 are coupled respectively by a front frame 11 and a rear frame 14, and thus a frame shape is formed as a whole.

As illustrated in FIG. 1A and FIG. 1B, a case body 20 is disposed between the pair of side frames 12, 13 so as to be suspended therebetween.

The case body 20 has a container shape, with side walls 22 standing upright at peripheral edges of a floor 21.

Of outer peripheral ends of the side walls 22, at least portions at both ends in the width direction of the vehicle body are further bent toward the outer side in the width direction of the vehicle body to form fastening portions 23 as illustrated in FIG. 1B. Thus, the fastening portions 23 can be fastened and fixed respectively to upper surfaces of the pair of side frames 12, 13. The fastening portions 23 may be formed so as to be fastened and fixed to also upper surfaces of the front frame 11 and the rear frame 14.

Figure 2A:
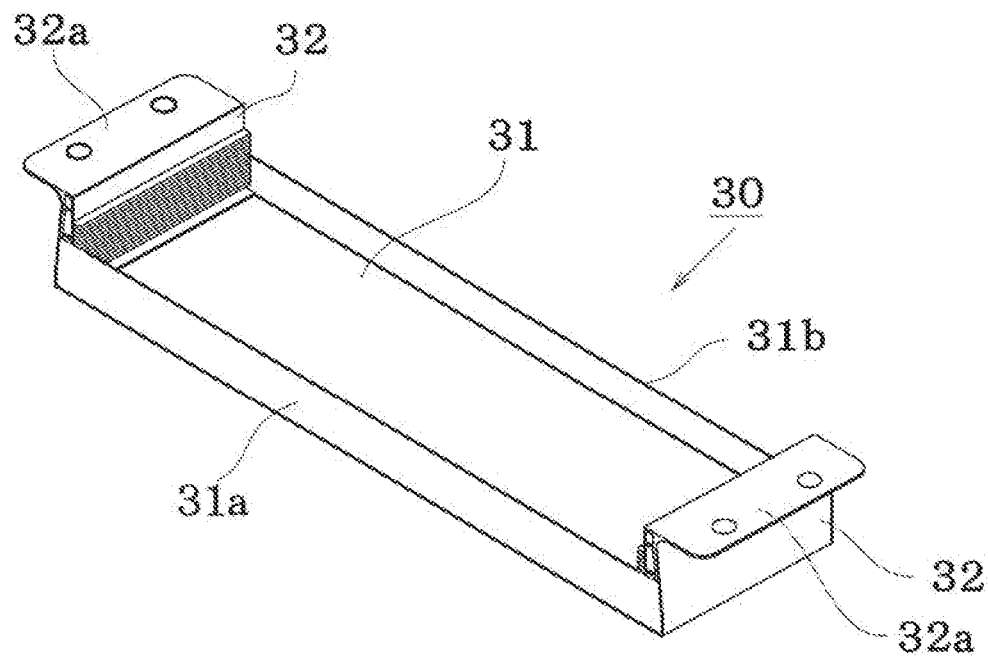
FIG. 2A illustrates a perspective view of a mounting member for a battery module.

The battery module 1 is mounted on and protected by a mounting member 30 of which a perspective view is illustrated in FIG. 2A.

Figure 2B:
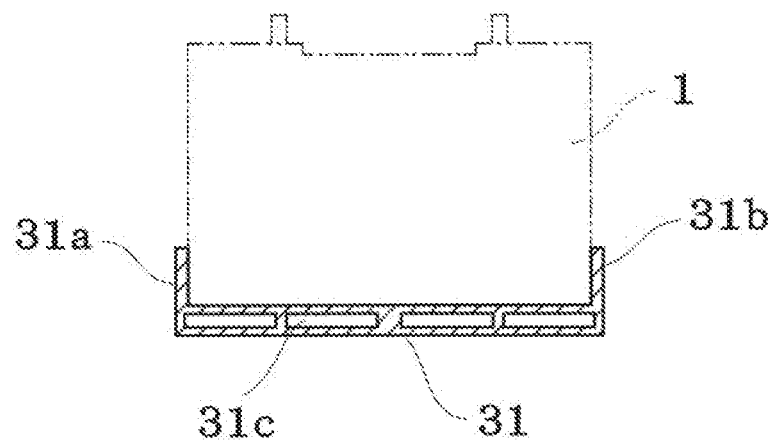
FIG. 2B illustrates a sectional view taken along line B-B of FIG. 1A.

As illustrated in the sectional views of FIG. 1B and FIG. 2B, the mounting member 30 has a pair of mounting parts 32 coupled to both ends in a longitudinal direction of a holding panel 31 that has a substantially U-shaped cross-section along line B-B.

As illustrated in FIG. 1B, the pair of mounting parts 32 are coupled to the ends of the holding panel 31 through coupling portions 32b provided at lower ends of the mounting parts 32, and upper portions of the mounting parts 32 are extended toward the outer side in the width direction of the vehicle body to form fixing portions 32a.

The battery module 1 is placed and held on an upper surface of the holding panel 31 so as to be sandwiched inside the pair of mounting parts 32.

As illustrated in FIG. 1B, the fastening portion 23 of the case body 20 is fastened and fixed by fastening members 40, such as bolts (see FIG. 1A), such that the fastening portion 23 of the case body 20 is sandwiched between an upper surface 12a of the side frame 12 and the fixing portion 32a that is provided from an upper end of one of the pair of mounting parts 32 toward the outer side in the width direction of the vehicle body. The other of the pair of mounting parts 32 is fastened and fixed to the side frame 13 in the same manner.

While the mounting member 30 also has a hollow sectional shape with hollow portions 32c in this example, the mounting member 30 may instead have the form of a plate-shaped bracket.

As illustrated in FIG. 2B, the holding panel 31 accommodates a lower part of the battery module 1 between side edge portions 31a, 31b. The holding panel 31 has a hollow sectional shape with hollow portions 31c, and a refrigerant can be circulated through the hollow portions 31c to thereby cool the battery module 1.

When the battery module 1 is installed in the vehicle and an impact is applied from outside during running etc., the vehicle body frame 2 deforms and the load is transmitted to the side frame 12 as indicated by the arrows in FIG. 1B.

As this force is dispersed to the case body 20 and the mounting member 30, this structure is highly effective in protecting the battery module 1.

In this example, the battery module can be installed also in a space on a lower side of a seat as illustrated in FIG. 1A. For this purpose, a frame body is formed by a pair of under-seat side frames 17, 18, an under-seat front frame 15, and an under-seat rear frame 16. A case body 20A can be disposed on an inner side of this frame body, and the battery module can be held by a mounting member 30A on an inner side of the case body 20A in the same manner.

As the case body 20A and the mounting member 30A share common features with the case body 20 and the mounting member 30 provided under the floor, the description of the former will be omitted.

Further, in this example, the rear frame 14 and the under-seat front frame 15 are coupled to each other by a plate 19 as illustrated in FIG. 1A.

What is claimed is:

1. A battery module in-vehicle installation structure, comprising:

a pair of side frames that are fixed to a vehicle and arranged at intervals in a width direction of the vehicle;

a case body fastened between the pair of side frames; and a mounting member that mounts a battery module inside the case body and is fixed to the pair of side frames, the case body having a floor, side walls standing upright at peripheral edges of the floor, and a pair of fastening portions extended respectively from upper portions of the side walls toward an outer side in the width direction, the mounting member having a holding part that holds the battery module, a pair of mounting parts coupled to and standing upright at both ends of the holding part, and a pair of fixing portions each extended from upper portions of the pair of mounting parts toward the outer side in the width direction, each of the pair of fastening portions being fastened so as to be sandwiched between one of the pair of fixing portions and one of the pair of side frames, and wherein:
a first clearance is provide in the width direction between each of the side walls and each of the pair of side frames; and
a second clearance is provided in the width direction between each of the side walls and each of the pair of mounting parts.

2. The battery module in-vehicle installation structure according to claim 1, wherein the pair of side frames are formed by extruded materials having a hollow sectional shape.

3. The battery module in-vehicle installation structure according to claim 1, wherein the holding part of the mounting member is a panel body having a hollow sectional shape with hollow portions.

4. The battery module in-vehicle installation structure according to claim 3, wherein a refrigerant is circulated through the hollow portions.

5. The battery module in-vehicle installation structure according to claim 1, wherein the pair of mounting parts of the mounting member is a panel body having a hollow sectional shape with hollow portions.

* * * * *